US010582404B2

(12) United States Patent
Rashid et al.

(10) Patent No.: US 10,582,404 B2
(45) Date of Patent: Mar. 3, 2020

(54) DYNAMIC FREQUENCY SELECTION (DFS) IN LICENSED-ASSISTED ACCESS NETWORKS USING LTE

(71) Applicant: Intel Corporation, Santa Clara, CA (US)

(72) Inventors: Mohammad Mamunur Rashid, Hillsboro, OR (US); Kathiravetpillai Sivanesan, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/754,487

(22) PCT Filed: Sep. 22, 2015

(86) PCT No.: PCT/US2015/051411
§ 371 (c)(1),
(2) Date: Feb. 22, 2018

(87) PCT Pub. No.: WO2017/052508
PCT Pub. Date: Mar. 30, 2017

(65) Prior Publication Data
US 2018/0242182 A1    Aug. 23, 2018

(51) Int. Cl.
*H04W 4/00*    (2018.01)
*H04W 24/10*    (2009.01)
(Continued)

(52) U.S. Cl.
CPC ........... *H04W 24/10* (2013.01); *H04W 88/06* (2013.01); *H04W 88/10* (2013.01); *H04W 84/045* (2013.01)

(58) Field of Classification Search
USPC ........................................................ 370/329
See application file for complete search history.

(56) References Cited

U.S. PATENT DOCUMENTS

2015/0063147 A1    3/2015  Sadek et al.
2015/0208311 A1*   7/2015  Lee ....................... H04W 24/10
                                                             455/436

(Continued)

FOREIGN PATENT DOCUMENTS

CN          103929257           7/2014
CN          103929257 A         7/2014

(Continued)

OTHER PUBLICATIONS

"BRAN; 5 GHz high performance RLAN; Guide to the implementation of Dynamic Frequency Selection (DFS)", ETSI TR 102651 V1.1.1, [Online] Retrieved from the internet: <https://portal.etsi.org/webapp/workprogram/Report_WorkItem.asp?WKI_ID=27264> See sections 10.1-10.3, (Jun. 12, 2009).

(Continued)

*Primary Examiner* — Phuongchau Ba Nguyen
(74) *Attorney, Agent, or Firm* — Schwegman Lundberg & Woessner, P.A.

(57) ABSTRACT

Embodiments of an evolved Node B (eNB) and User Equipment (UE) for dynamic frequency selection are generally described herein. An eNB may include a transceiver to: receive an indication from a User Equipment (UE) indicating that the UE is capable of detecting radar, send instructions to the UE to detect radar on a channel of an unlicensed band, the instructions including a scheduling information element and a measurement information element, and receive a notification of radar on the channel of the unlicensed band from the UE. The eNB may include a processor to: determine whether the radar was previously detected by the eNB on the channel of the unlicensed band, and in response to determining that the radar was previously undetected, detect radar on the channel of the unlicensed band.

25 Claims, 7 Drawing Sheets

(51) Int. Cl.
*H04W 88/06* (2009.01)
*H04W 88/10* (2009.01)
*H04W 84/04* (2009.01)

(56) References Cited

U.S. PATENT DOCUMENTS

2015/0296508 A1* 10/2015 Fan ................... H04W 72/0446 370/329
2016/0205578 A1* 7/2016 Lee ....................... H04W 24/10 455/442

FOREIGN PATENT DOCUMENTS

| KR | 1020040076865 | 9/2004 |
| KR | 1020040076865 A | 9/2004 |
| WO | 2015034830 | 3/2015 |
| WO | WO-2015034830 A1 | 3/2015 |
| WO | 2017052508 | 3/2017 |

OTHER PUBLICATIONS

"International Application Serial No. PCT/US2015/051411, International Search Report dated Jun. 22, 2016", 2 pgs.

"International Application Serial No. PCT/US2015/051411, Written Opinion dated Jun. 22, 2016", 4 pgs.

"BRAN; 5 GHz high performance RLAN; Guide to the implementation of Dynamic Frequency Selection (DFS)", ETSI TR 102651 V1.1.1, [Online] Retrieved from the internet:https; portal.etsi.org webapp workprogram Report_WorkItem.asp?WKI_ID=27264 See sections 10.1-10.3, (Jun. 12, 2009), 23 pgs.

ETSI, "Broadband Radio Access Networks (BRAN); 5 GHz high performance RLAN; Harmonized EN covering the essential requirements of article 3.2 of the RandTTE Directive", ETSI EN 301 893 V1.7.2, (Jul. 2014), 95 pgs.

ETSI, "LTE; Evolved Universal Terrestrial Radio Access (E-UTRA); Medium Access Control (MAC) protocol specification (3GPP TS 36.321 version 12.2.1 Release 12)", ETSI TS 136 321 V12.2.1 (Oct. 2014), (Jun. 2014), 59 pages.

* cited by examiner

DYNAMIC FREQUENCY SELECTION (DFS) IN LICENSED-ASSISTED ACCESS NETWORKS USING LTE

CLAIM OF PRIORITY

This patent application is a U.S. National Stage Application under 35 U.S.C. 371 from International Application No. PCT/US2015/051411, filed Sep. 22, 2015, published as WO2017052508, which is incorporated herein by reference.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE-Advanced), although the scope of the embodiments is not limited in this respect. Some embodiments relate to detecting radar on a channel of an unlicensed band.

BACKGROUND

3rd Generation Partnership Project (3GPP) Universal Terrestrial Radio Access Network (UTRAN) Long-Term-Evolution (LTE) or LTE-Advanced (LTE-A) networks can use unlicensed spectrum (LTE-U) to operate in the 5 GHz band.

In many geographic regions, Dynamic Frequency Selection (DFS) is a mandatory regulatory requirement for operating in the 5 GHz band. To conform to this requirement, equipment operating in the unlicensed spectrum have to vacate a channel when radar is detected on that channel. For example, according to some standards, a channel must be vacated within 10 seconds of detecting radar on the channel and the transmission may not resume for a non-occupancy-period (NOP) of 30 minutes. If LTE networks utilize such DFS mandated unlicensed bands then they have to detect presence of radars as quickly as possible. Delay in detecting radar signals may cause unintended disruption to the operation of the networks. Current solutions to detecting radar are sometimes inefficient or do not accurately detect radar.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An LTE network may use unlicensed spectrum in addition to the licensed band allocated to the LTE network. An LTE-U network (e.g., one using both licensed and unlicensed bandwidth) may have DFS requirements to monitor for radar on the unlicensed band. Several options for LTE-U networks to promptly react to radar detections in geographical areas where DFS on the unlicensed spectrum (utilized by the LTE-U system) is mandated by regulation are described below. Briefly, these options may include a signaling enhancement by which a User Equipment (UE) may inform an evolved Node B (eNB) about the UE's radar detection capabilities, enhancements to LTE measurement and reporting signaling to accommodate the radar detection-capable UE to be configured to perform radar detection and to report to the serving eNB. Another option includes signaling enhancements to utilize an X2 interface between neighboring eNBs to share radar detection information for enabling fast response to radar detection. Yet another option includes signaling enhancements by which a Mobility Management Entity (MME) may help in fast response to radar detection by forwarding radar detection information from one eNB to another eNB when the second eNB is potentially affected by the same radar transmission.

Figure 1:
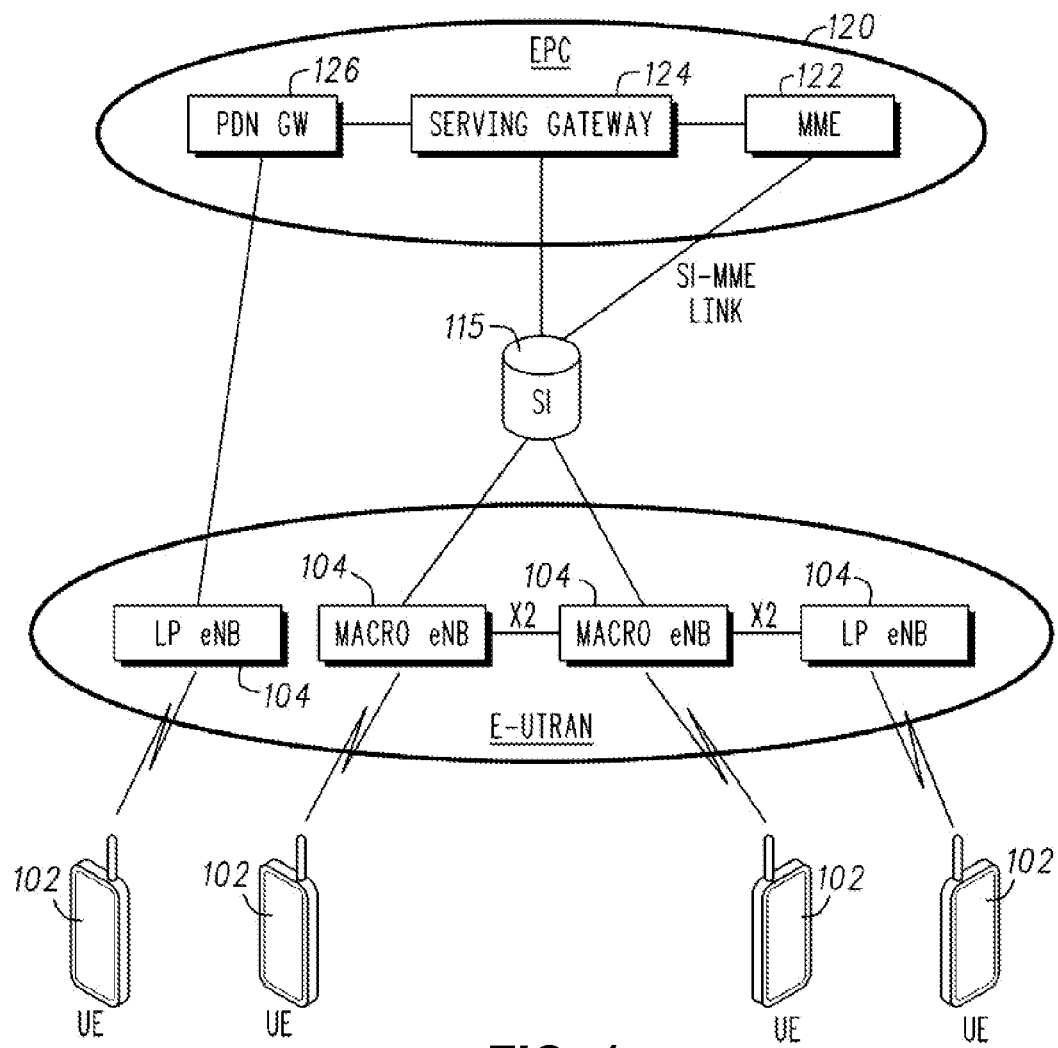
FIG. 1 illustrates generally a portion of an end-to-end network architecture of an LTE network with various components of the network in accordance with some embodiments.

FIG. 1 illustrates generally a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For sake of convenience and brevity, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
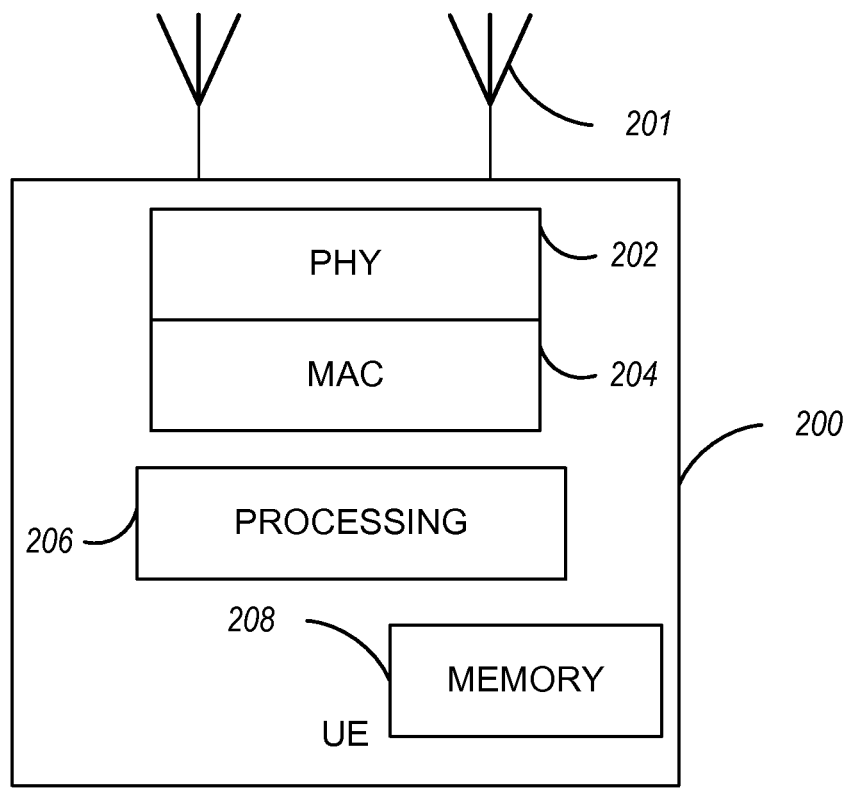
FIG. 2 illustrates generally a functional block diagram of a User Equipment (UE) in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer circuitry 202 for transmitting and receiving signals to and from eNBs 104 (FIG. 1) using one or more antennas 201. UE 200 may also include medium access control layer (MAC) circuitry 204 for controlling access to the wireless medium. UE 200 may also include processing circuitry 206 and memory 208 arranged to configure the various elements of the UE to perform the operations described herein.

In accordance with some embodiments, the MAC circuitry 204 may be arranged to contend for a wireless medium configure frames or packets for communicating over the wireless medium and the PHY circuitry 202 may be arranged to transmit and receive signals. The PHY 202 may include circuitry for modulation/demodulation, upconversion/downconversion, filtering, amplification, etc. In some embodiments, the processing circuitry 206 of the device 200 may include one or more processors. In some embodiments, two or more antennas may be coupled to the physical layer circuitry arranged for sending and receiving signals. The physical layer circuitry may include one or more radios for communication in accordance with cellular (e.g., LTE) and WLAN (e.g., IEEE 802.11) techniques. The memory 208 may be store information for configuring the processing circuitry 206 to perform operations for configuring and transmitting HEW frames and performing the various operations described herein.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device, a medical device (e.g., a heart rate monitor, a blood pressure monitor, etc.), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 200 and the eNBs may be configured to communicate in accordance with an orthogonal frequency division multiple access (OFDMA) technique.

In LTE-U deployments, Dynamic Frequency Selection (DFS) is a mandatory regulatory requirement in some locations. To detect radar for DFS, currently an eNB is configured to detect radar on an operating channel. If radar is present, the eNB halts traffic on the channel and switches to a different channel, not using the original channel for at least 30 minutes.

However, there is a possibility that the eNB may not promptly detect or may even miss a radar transmission. This can occur when the radar transmission is occurring inside its coverage. For example, when the radar transmission is affecting a portion of the coverage area of the eNB, and that portion is overlapping with one or more UEs, but not the eNB itself, the eNB may not detect the radar.

In another example, an eNB may be late in detecting a radar. Other eNBs in the area may have already detected the radar transmission on a given channel, but the late detecting eNB may be unaware of the radar already detected by the other eNBs.

Figure 3:
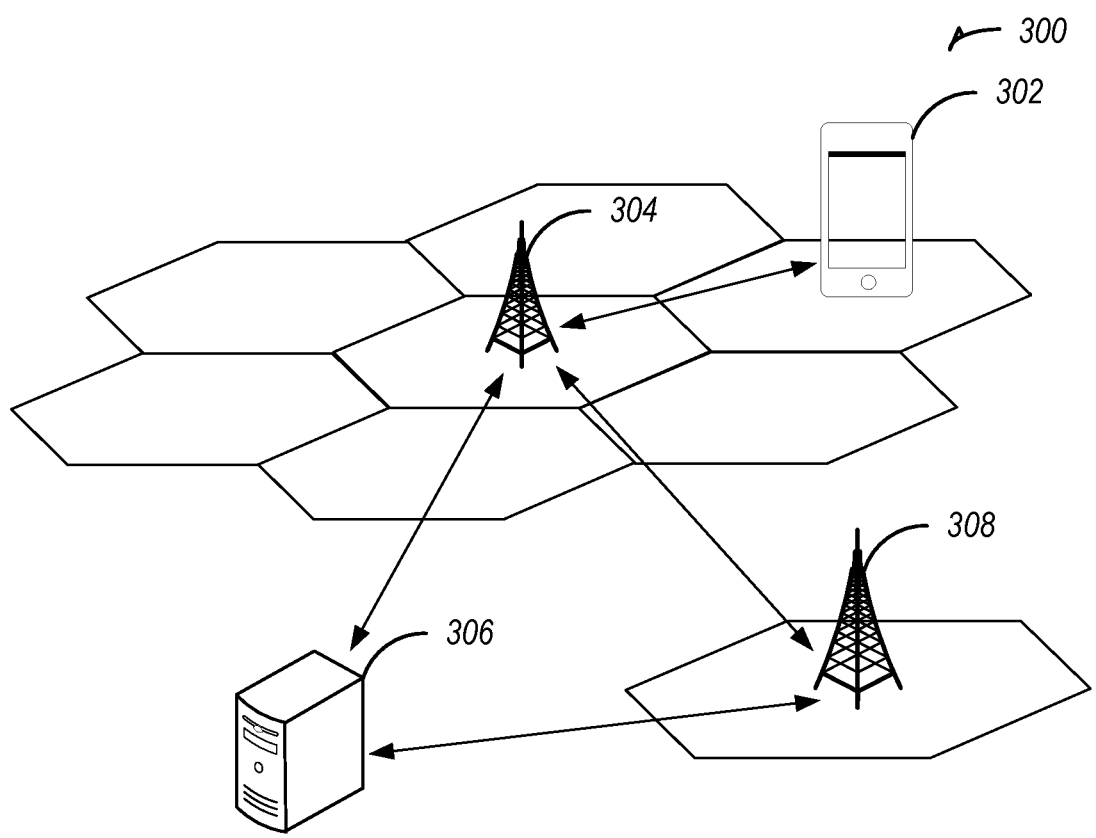
FIG. 3 illustrates generally a communication network in accordance with some embodiments.

FIG. 3 illustrates generally a communication network 300 in accordance with some embodiments. The communication network 300 of FIG. 3 includes a framework by which a LTE-U system operating potentially on unlicensed bands in DFS mandated regions quickly responds to potential radar transmissions in its coverage area. The communication network 300 includes example devices that communicate in an LTE-U system, such as UEs, eNBs, and MMEs. For example, communication network 300 includes a UE 302, a first eNB 304, a second eNB 308, and a MME 306. In an example, the MME 306 controls the first eNB 304 and the second eNB 308, and the first eNB 304 controls the UE 302.

In an example, UE 302 may include radar detection capabilities. The UE 302 with radar detection capability may be configured to detect and report radar to the first eNB 304. Various signaling enhancements may be used to achieve the configuration, detection, and reporting.

In another example, after the first eNB 304 becomes aware of radar transmission in its coverage area, either through its own detection or through a detection report from the UE 302 (or another UE in its coverage area), the first eNB 304 may inform neighboring eNBs, such as the second eNB 308. The information may be transmitted using an X2 interface. The second eNB 308, after receiving the information, may utilize this information to perform immediate radar detection. Signaling enhancements may be implemented, as described below, to achieve this communication. The eNB to eNB detected radar communication may be done with or without a UE that is capable of radar detection.

In yet another example, as an alternative to, or in addition to, the X2 based enhancement, the first eNB 304 may indicate to the MME 306 (or to multiple MMEs if multiple are available for communication with the first eNB 304) that radar has been detected on a channel. The MME may contact the eNBs that are likely to be affected by the radar transmission, such as, for example, the second eNB 308. The eNB to MME to eNB detected radar communication may be done with or without a UE that is capable of radar detection.

Figure 4:
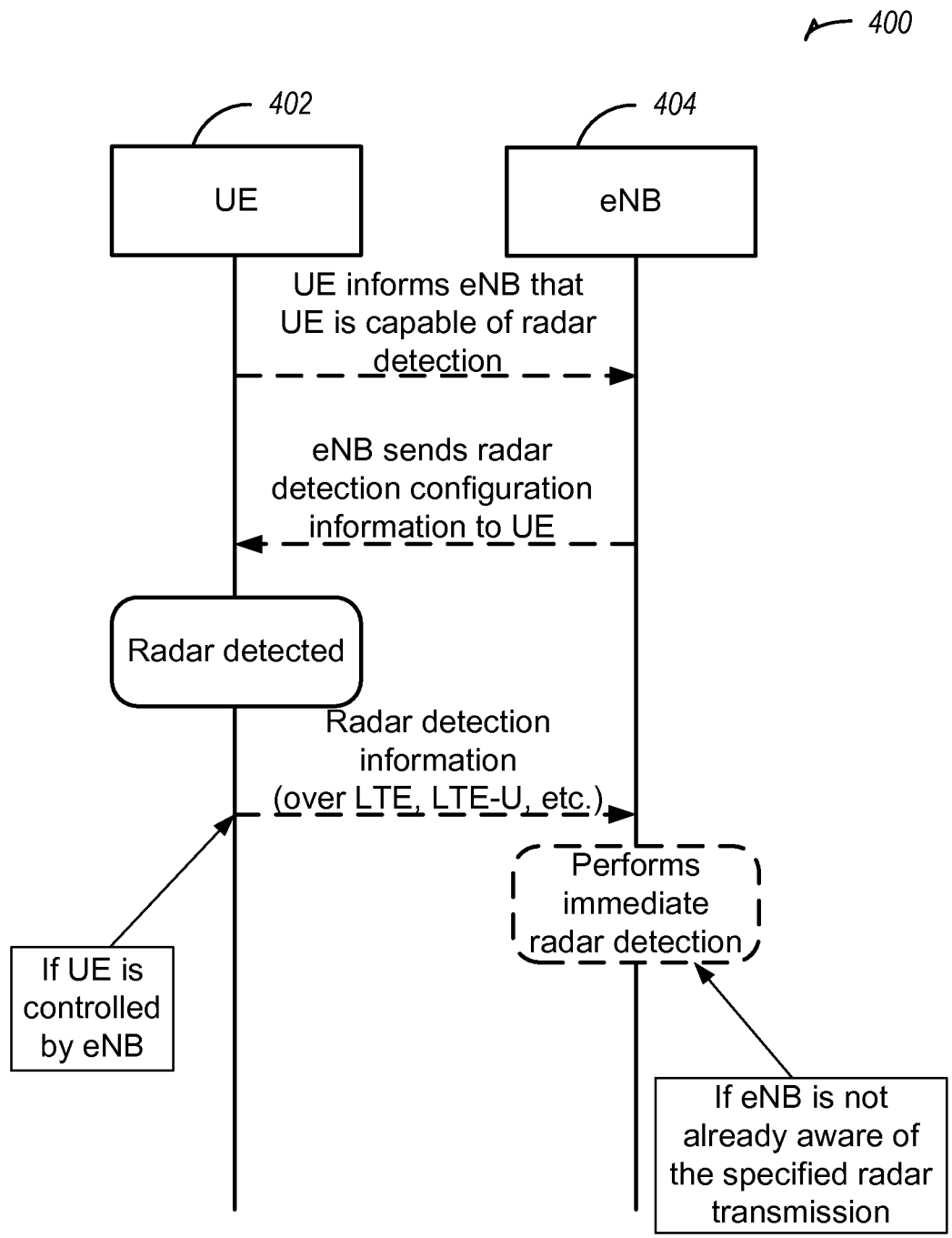
FIG. 4 illustrates generally a diagram showing radar detection communication between a User Equipment (UE) and an evolved Node B (eNB) in accordance with some embodiments.

FIG. 4 illustrates generally a diagram 400 showing radar detection communication between a UE 402 and an eNB 404 in accordance with some embodiments. A UE in an LTE-U system may not be required to implement radar detection or DFS, for example because of limits on a maximum uplink transmit power. Some UEs may implement radar detection functionality to assist a controlling eNB in the DFS mechanism. For example, a UE may be rewarded with an incentive (e.g. usage credit, lower usage pricing, priority access, etc.) in exchange for detecting radar. In diagram 400, UE 402 includes radar detection capability.

As a first operation, the UE 402 informs the eNB 404 that the UE 402 is capable of detecting radar. During the attach process or in response to a capability enquiry from the serving eNB 404, the UE 402 may signal its capability to detect radar. In an example, the following messaging changes (in italics/bold) may be used by UE 402 to indicate its radar detection capabilities to eNB 404, for example in a UECapabilityInformation message in an LTE standard. The UECapabilityInformation message may include a message found in a technical specification such as the 3GPP Technical Specification (TS) 36.331 "Evolved Universal Terrestrial Radio Access Network (E-UTRAN); Radio Resource Control (RRC); Protocol specification", (e.g., release version 12 or later).

The eNB 404 then may send radar detection configuration information to UE 402 to configure UE 402. The configuration information may include a schedule, such as if there are other UEs also available for radar detection or to coordinate with the radar detection of the eNB 404. In another example, the UE 402 can be preconfigured to detect radar, such as by another eNB or by eNB 404 previously (e.g., before becoming active, using licensed band communication, etc.). For example, after the eNB 404 is aware of the radar detection capability of UE 402, eNB 404 can configure UE 402 to do such monitoring through a measurement and reporting configuration. In an example, the following information element changes (in italics/bold) may be used by eNB 404 to configure UE 402, for example in a MeasObjectEUTRA information element in an LTE standard. The MeasObjectEUTRA information element may include an information element found in a technical specification such as the 3GPP Technical Specification (TS) 36.331 "Evolved Universal Terrestrial Radio Access Network (E-UTRAN); Radio Resource Control (RRC); Protocol specification", (e.g., release version 12 or later).

```
UECapabilityInformation message
-- ASN1START
UECapabilityInformation ::=              SEQUENCE {
    rrc-TransactionIdentifier               RRC-TransactionIdentifier,
    criticalExtensions                      CHOICE {
        c1                                      CHOICE{
            ueCapabilityInformation-r8   UECapabilityInformation-r8-IEs,
            spare7 NULL,
            spare6 NULL, spare5 NULL, spare4 NULL,
            spare3 NULL, spare2 NULL, spare1 NULL
        },
        criticalExtensionsFuture                SEQUENCE { }
    }
}
UECapabilityInformation-r8-IEs ::= SEQUENCE {
    ue-CapabilityRAT-ContainerList          UE-CapabilityRAT-ContainerList,
    nonCriticalExtension                    UECapabilityInformation-v8a0-IEs
    OPTIONAL
}
UECapabilityInformation-v8a0-IEs ::= SEQUENCE {
    lateNonCriticalExtension                OCTET STRING
    OPTIONAL,
    nonCriticalExtension                    UECapabilityInformation-v12xy-IEs
    OPTIONAL
}
UECapabilityInformation-v12xy-IEs ::= SEQUENCE {
    ue-RadioPagingInfo-r12                  UE-RadioPagingInfo-r12
    OPTIONAL,
    nonCriticalExtension                    UECapabilityInformation-v13xy-IEs
    OPTIONAL
}
UECapabilityInformation-v13xy-IEs ::=SEQUENCE {
    ue-RadarDetectionCapability-r13         UE-RadarDetectionCapability-r13
    OPTIONAL,
    nonCriticalExtension                    SEQUENCE {}
    OPTIONAL
}
UE-RadarDetectionCapability-r13::=SEQUENCE {
    radarDetectionCapabilityChannelList  SEQUENCE (SIZE
    (1 ... maxUnlicensedChannels))OF UnlicensedChannelInfo
}
UnlicensedChannelInfo::=SEQUENCE {
    unlicensedChannelId                     INTEGER,
    unlicensedChannelType                   ENUMERATED {ISM, U-NII}
}
    -- ASN1STOP
```

MeasObjectEUTRA Information Element

```
MeasObjectEUTRA information element
-- ASN1START
MeasObjectEUTRA ::=                    SEQUENCE {
    carrierFreq                            ARFCN-ValueEUTRA,
    allowedMeasBandwidth                   AllowedMeasBandwidth,
    presenceAntennaPort1                   PresenceAntennaPort1,
    neighCellConfig                        NeighCellConfig,
    offsetFreq                             Q-OffsetRange
    DEFAULT dB0,
    -- Cell list
    cellsToRemoveList                      CellIndexList
    OPTIONAL,                              -- Need ON
    cellsToAddModList                      CellsToAddModList
    OPTIONAL,                              -- Need ON
    -- Black list
    blackCellsToRemoveList                 CellIndexList
    OPTIONAL,                              -- Need ON
    blackCellsToAddModList                 BlackCellsToAddModList
    OPTIONAL,                              -- Need ON
    cellForWhichToReportCGI                PhysCellId
    OPTIONAL,                              -- Need ON
    ...,
    [[measCycleSCell-r10                   MeasCycleSCell-r10  OPTIONAL, --
Need ON
        measSubframePatternConfigNeigh-r10
    MeasSubframePatternConfigNeigh-r10     OPTIONAL    -- Need ON
    ]],
    [[widebandRSRQ-Meas-r11                BOOLEANOPTIONAL
-- Cond WB-RSRQ
    ]],
    [[altTTT-CellsToRemoveList-r12         CellIndexList  OPTIONAL,
-- Need ON
        altTTT-CellsToAddModList-r12       AltTTT-CellsToAddModList-
r12  OPTIONAL                              -- Need ON
    ]],
    [[t312-r12                             ENUMERATED {ms0, ms50, ms100,
ms200, ms300, ms400, ms500, ms1000}     OPTIONAL   -- Need ON
    ]]
    [[radarPresenceDetection               BOOLEANOPTIONAL
    OPTIONAL,                              -- Need ON
    ]],
}
MeasObjectEUTRA-v9e0 ::=               SEQUENCE {
    carrierFreq-v9e0                       ARFCN-ValueEUTRA-v9e0
}
CellsToAddModList ::=
(1..maxCellMeas)) OF CellsToAddMod
CellsToAddMod ::= SEQUENCE {
    cellIndex                              INTEGER (1..maxCellMeas),
    physCellId                             PhysCellId,
    cellIndividualOffset                   Q-OffsetRange
}
BlackCellsToAddModList ::=             SEQUENCE (SIZE
(1..maxCellMeas)) OF BlackCellsToAddMod
BlackCellsToAddMod ::=                 SEQUENCE {
    cellIndex                              INTEGER (1..maxCellMeas),
    physCellIdRange                        PhysCellIdRange
}
MeasCycleSCell-r10 ::=                 ENUMERATED {sf160, sf256,
sf320, sf512, sf640, sf1024, sf1280, spare1}
MeasSubframePatternConfigNeigh-r10 ::= CHOICE {
    release                                        NULL,
    setup                                  SEQUENCE {
        measSubframePatternNeigh-r10       MeasSubframePattern-r10,
        measSubframeCellList-r10           MeasSubframeCellList-r10
    OPTIONAL -- Cond always
    }
}
MeasSubframeCellList-r10 ::=           SEQUENCE (SIZE (1..maxCellMeas)) OF
PhysCellIdRange
AltTTT-CellsToAddModList-r12 ::= SEQUENCE (SIZE (1..maxCellMeas)) OF
AltTTT-CellsToAddMod-r12
AltTTT-CellsToAddMod-r12 ::=           SEQUENCE {
    cellIndex                              INTEGER
(1..maxCellMeas),
    physCellIdRange                        PhysCellIdRange
}
-- ASN1STOP
```

The UE 402 may then detect radar according to the schedule and other configurations sent by the eNB 404. To detect radar, the UE 402 may be configured using a QuantityConfig information element (IE) in LTE or LTE-U systems. To be coupled with the measurement object enhancement described above, another element may be added to the quantity configuration as described below. In an example, the following information element changes (in italics/bold) may be used by eNB 404, for example in a QuantityConfig information element in an LTE standard. The QuantityConfig information element may include an information element found in a technical specification such as the 3GPP Technical Specification (TS) 36.331 "Evolved Universal Terrestrial Radio Access Network (E-UTRAN); Radio Resource Control (RRC); Protocol specification", (e.g., release version 12 or later).

*QuantityConfig* information element

```
-- ASN1START
QuantityConfig ::=            SEQUENCE {
    quantityConfigEUTRA       QuantityConfigEUTRA             OPTIONAL,
-- Need ON
    quantityConfigUTRA        QuantityConfigUTRA              OPTIONAL,
-- Need ON
    quantityConfigGERAN       QuantityConfigGERAN             OPTIONAL,
-- Need ON
    quantityConfigCDMA2000    QuantityConfigCDMA2000          OPTIONAL,
-- Need ON
    ...,
    [[                        quantityConfigUTRA-v1020  QuantityConfigUTRA-v1020
                              OPTIONAL -- Need ON
    ]]
}
QuantityConfigEUTRA ::=       SEQUENCE {
    filterCoefficientRSRP     FilterCoefficient               DEFAULT fc4,
    filterCoefficientRSRQ     FilterCoefficient               DEFAULT fc4
```
*measQuantityUnlicensed        ENUMERATED {radarPresence}*
*OPTIONAL*
*- - Need ON*
*//Note that only DFS relevantquantity is listed here;other unlicensed operation*
*related options may also be included in measQuantityUnlicensed field*
```
QuantityConfigUTRA ::= SEQUENCE {
    measQuantityUTRA-FDD             ENUMERATED {cpich-RSCP, cpich-
EcN0},
    measQuantityUTRA-TDD             ENUMERATED {pccpch-RSCP},
    filterCoefficient         FilterCoefficient               DEFAULT fc4
}
QuantityConfigUTRA-v1020 ::= SEQUENCE {
    filterCoefficient2-FDD-r10       FilterCoefficient        DEFAULT fc4
}
QuantityConfigGERAN ::=       SEQUENCE {
    measQuantityGERAN                ENUMERATED {rssi},
    filterCoefficient         FilterCoefficient               DEFAULT fc2
}
QuantityConfigCDMA2000 ::=    SEQUENCE {
    measQuantityCDMA2000             ENUMERATED {pilotStrength,
pilotPnPhaseAndPilotStrength}
}
-- ASN1STOP
```

When radar is detected by the UE 402, it may communicate with the eNB 404 to alert the eNB 404 to the presence of radar. Information about the detected radar may be sent by the UE 402 using LTE standards, LTE-U standards or via other communication networks. The communication with the eNB 404 from the UE 402 may be dependent on the eNB 404 controlling the UE 402. For example, when the UE 402 is first controlled by, and configured to detect radar by, the eNB 404, and then when the UE 402 detects radar the eNB 404 is no longer controlling the UE 402, the UE 402 may not send the information to the eNB 404. Instead, the UE 402 may send the information to a second eNB, if the second eNB controls the UE 402 at the time the UE 402 detects the radar.

In another example, a reporting configuration may be coupled with the enhanced measurement object definition.

To support reporting of radar detection for DFS purposes, a new type of reporting event called A7 in the reporting configuration may be used. Event A7 may include radar detected in a Secondary Cell (SCell). In an example, the following information element changes (in italics/bold) may be used, for example in a ReportConfigEUTRA information element in an LTE standard. The ReportConfigEUTRA information element may include an information element found in a technical specification such as the 3GPP Technical Specification (TS) 36.331 "Evolved Universal Terrestrial Radio Access Network (E-UTRAN); Radio Resource Control (RRC); Protocol specification", (e.g., release version 12 or later).

ReportConfigEUTRA Information Element

```
ReportConfigEUTRA information element
-- ASN1START
ReportConfigEUTRA ::=    SEQUENCE {
    triggerType              CHOICE {
        event                    SEQUENCE {
            eventId                  CHOICE {
                eventA1                  SEQUENCE {
                    a1-Threshold             ThresholdEUTRA
                },
                eventA2                  SEQUENCE {
                    a2-Threshold             ThresholdEUTRA
                },
                eventA3                  SEQUENCE {
                    a3-Offset                INTEGER (-30..30),
                    reportOnLeave            BOOLEAN
                },
                eventA4                  SEQUENCE {
                    a4-Threshold             ThresholdEUTRA
                },
                eventA5                  SEQUENCE {
                    a5-Threshold1            ThresholdEUTRA,
                    a5-Threshold2            ThresholdEUTRA
                },
                ...,
                eventA6-r10              SEQUENCE {
                    a6-Offset-r10            INTEGER (-30..30),
                    a6-ReportOnLeave-r10     BOOLEAN
                }
                eventA7-r13              SEQUENCE {
                    radarPresence-r13        BOOLEAN
                }
            },
            hysteresis               Hysteresis,
            timeToTrigger            TimeToTrigger
        },
        periodical               SEQUENCE {
            purpose                  ENUMERATED {
                                         reportStrongestCells,
                                         reportCGI}
        }
    },
    triggerQuantity          ENUMERATED {rsrp, rsrq, radarPresence},
    reportQuantity           ENUMERATED {sameAsTriggerQuantity, both},
    maxReportCells           INTEGER (1..maxCellReport),
    reportInterval           ReportInterval,
    reportAmount             ENUMERATED {r1, r2, r4, r8, r16, r32, r64, infinity},
    ...,
    [[    si-RequestForHO-r9                  ENUMERATED {setup}
    OPTIONAL,    -- Cond reportCGI
          ue-RxTxTimeDiffPeriodical-r9        ENUMERATED {setup}
    OPTIONAL     -- Need OR
    ]],
    [[    includeLocationInfo-r10             ENUMERATED {true}
    OPTIONAL,    -- Need OR
          reportAddNeighMeas-r10              ENUMERATED {setup}
    OPTIONAL     -- Need OR
    ]],
    [[    alternativeTimeToTrigger-r12        TimeToTrigger
    OPTIONAL,
```

```
-- Need OR
            useT312-r12             ENUMERATED {setup}
        OPTIONAL    -- Cond event
      ]]
}
ThresholdEUTRA ::=          CHOICE{
    threshold-RSRP                  RSRP-Range,
    threshold-RSRQ                  RSRQ-Range
}
-- ASN1STOP
```

In an example, a MeasResults information element in LTE may include mandatory fields for reporting Reference Signal Received Power (RSRP) or Reference Signal Received Quality (RSRQ) results of a PCell on a measurement object. However, in a LTE-U system, a PCell may not exist on an unlicensed radio channel. A new measurement results information element (IE) may be used in the LTE-U system to measure the unlicensed spectrum. In an example, the following information element changes (in italics/bold) may be used, for example in a MeasResultsUnlicensed information element in an LTE-U standard. The MeasResultsUnlicensed information element may include an information element found in a technical specification such as the 3GPP Technical Specification (TS) 36.331 "Evolved Universal Terrestrial Radio Access Network (E-UTRAN); Radio Resource Control (RRC); Protocol specification", (e.g., release version 12 or later). MeasResultsUnlicensed information element

```
MeasResultsUnlicensed information element
--ASN1START
MeasResultsUnlicensed ::=   SEQUENCE {
    measId                      MeasId,
    unlicensedChannelId         INTEGER
    radarDetected               BOOLEAN  OPTIONAL  NEED -ON
}
--ASN1STOP
```

The newly proposed IE (and the modified IEs described above) may contain more fields that are relevant to other aspects of LTE-U. In this disclosure, fields relevant for DFS are described.

After receiving the radar detection information, the eNB 404 may perform radar detection itself, such as to determine additional information about the radar, determine whether the eNB 404 is in range of the radar, etc. In an example, after receiving the radar detection information, the eNB 404 may compare the information received from UE 402 to information received from another UE, eNB, or MME, or from radar that the eNB 404 itself detected to determine whether the information received from UE 402 is redundant. If the eNB 404 is already aware of the radar detected by the UE 402, the eNB 404 may not need to perform radar detection.

Figure 5:
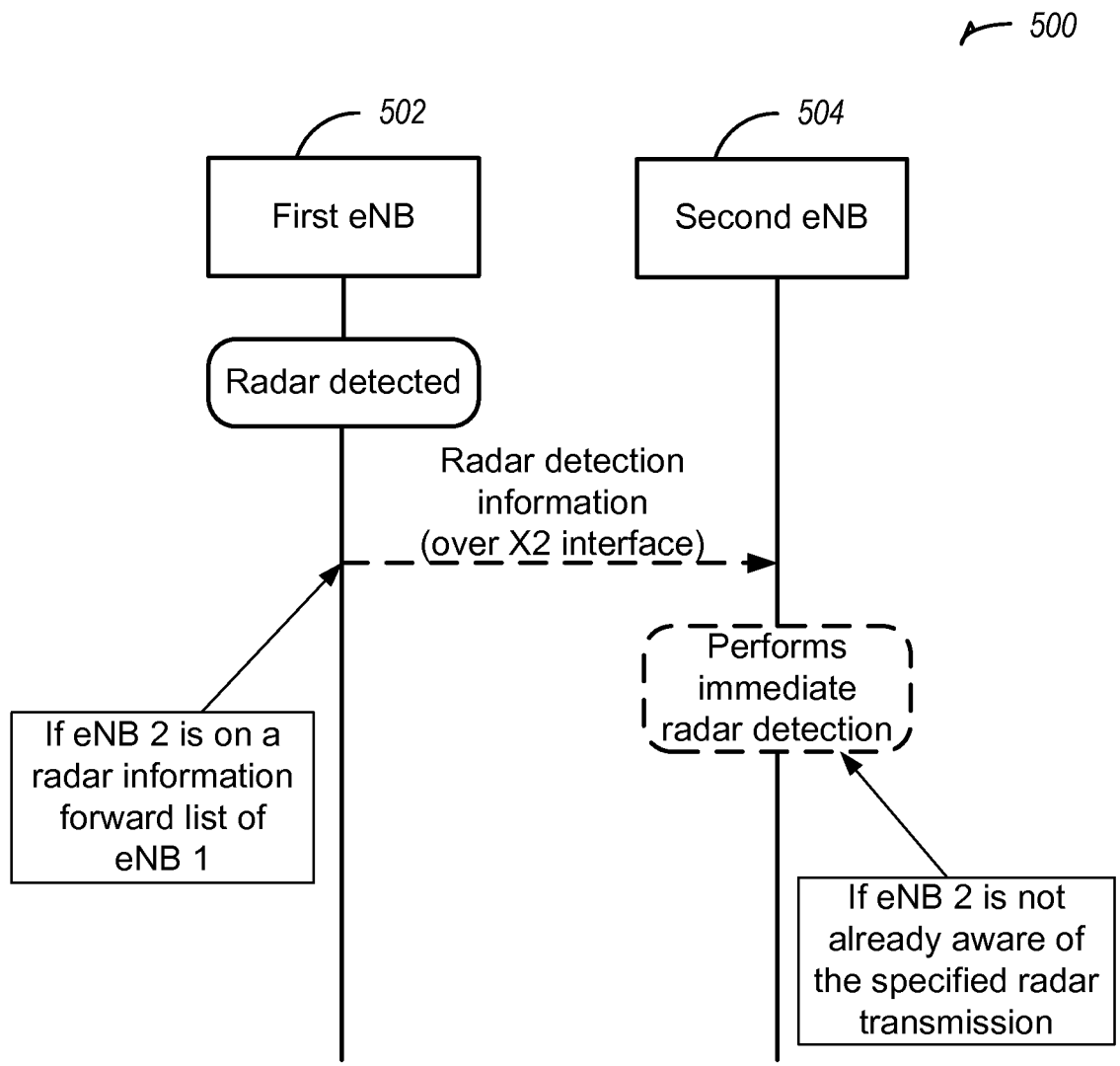
FIG. 5 illustrates generally a diagram showing radar detection communication between two evolved Node Bs (eNBs) in accordance with some embodiments.

FIG. 5 illustrates generally a diagram 500 showing radar detection communication between two evolved Node Bs (eNBs) in accordance with some embodiments. In diagram 500, a first eNB 502 is in communication with a second eNB 504.

In an example, the first eNB 502 detects radar, is informed of detected radar, or both. After the radar is detected, the first eNB 502 may check a radar information forward list of eNBs. The eNBs on the radar information forward list may include a static or dynamic list of eNBs, such as a list of eNBs immediately surrounding the first eNB 502, a list of eNBs 502 received from an MME, a list of eNBs in a likely range of a radar signal (e.g., based on radar signal strength, neighboring eNBs, eNBs within a specified distance, etc.), or the like. In an example, the second eNB 504 may be on the radar information forward list. In this example, the first eNB 502 sends radar detection information to the second eNB 504, since the second eNB 504 is on the radar information forward list. After receiving the information, the second eNB 504 may perform radar detection. If the second eNB 504 is already aware of the radar (such as from its own detection or receiving a notification from another eNB, a UE, or a MME), it may not need to perform radar detection.

In an example, the first eNB 502 may communicate the radar detection information to the second eNB 504 using an X2 interface and an X2-based enhancement in an X2 message, as described below in Table 1. After investigating the received X2 message, the second eNB 504 may forward radar detection information to other eNBs if they are in the forward list for the second eNB 504. Each eNB may have a separate radar information forward list. When eNB 504 receives a radar detection message, eNB 504 may temporarily remove eNB 502 (the eNB that originated the message) from the eNB 504 radar detection forward list before forwarding information (preventing the first eNB 502 from receiving its own message back).

To achieve the above enhancement, the following X2 messages may be added to a technical specification such as the 3GPP Technical Specification (TS) 36.423 "Evolved Universal Terrestrial Radio Access Network (E-UTRAN); X2 Application Protocol (X2AP)", (e.g., release version 12 or later). The X2 messages may be used by an eNB to indicate that radar is detected in an unlicensed channel:

TABLE 1

RADAR DETECTION INDICATION
in the direction first eNB → second eNB.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Unlicensed channel type | M | | ENUMERATED (ISM, UNII, . . .) | | YES | ignore |
| Unlicensed channel id | M | | INTEGER | | YES | ignore |
| Radar Detection Time stamp | M | | BIT STRING (16) | | | |
| Criticality Diagnostics | O | | 9.2.7 | | YES | ignore |

Figure 6:
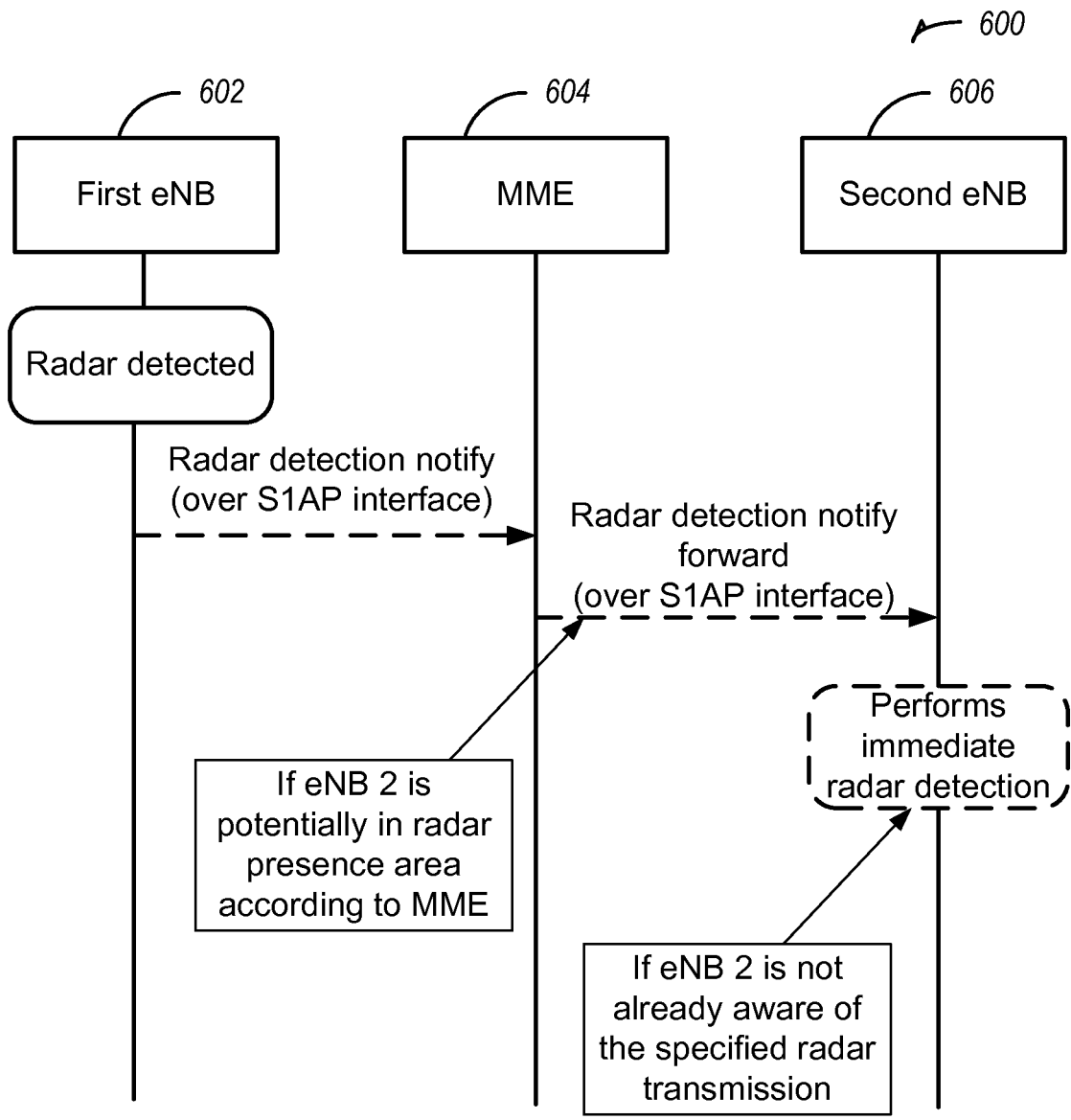
FIG. 6 illustrates generally a diagram showing radar detection communication between evolved Node Bs (eNBs) and a Mobility Management Entity (MME) in accordance with some embodiments.

FIG. 6 illustrates generally a diagram 600 showing radar detection communication between evolved Node Bs (eNBs)

and a Mobility Management Entity (MME) in accordance with some embodiments. In diagram 500, a first eNB 602 is in communication with a MME 604, which communicates with a second eNB 606. The first eNB 602 detects radar (e.g., by directly detecting the radar, receiving an indication of detected radar from a UE in its control, etc.) and notifies the MME 604 of the detected radar. The MME 604 is associated with the first eNB 602 and the second eNB 606. When the MME 604 receives the notification, it may determine which other eNBs may be in range of the radar or which eNBs may have coverage area affected by the radar. The MME 604 may have a list of eNBs that are likely to be affected by radar given an originating eNB (in this case the first eNB 602). The MME 604 may adjust the list based on other received notifications, distances, signal strength of the detected radar, or the like. In another example, the MME 604 may determine eNBs to forward the notification to on the fly.

In diagram 600, MME 604 forwards the radar notification to the second eNB 606. The MME 604 may receive the notification from the first eNB 602 and forward the notification to the second eNB 606 using a S1 Application Protocol (S1AP) interface. The S1AP interface may include the S1AP interface found in a technical specification such as the 3GPP Technical Specification (TS) 36.413 "Evolved Universal Terrestrial Radio Access Network (E-UTRAN); S1 Application Protocol (S1AP)", (e.g., release version 12 or later). The MME 604 forwards the radar notification to the second eNB 606 when the second eNB 606 is potentially in a radar presence area according to the MME 604. The MME 604 may forward the notification to other eNBs at this time as well. After receiving the radar detection notification forwarded from the MME 604, the eNB 606 may perform radar detection. In another example, the eNB 606 may not need to perform radar detection if it is already aware of the specified radar (e.g., it previously detected the radar, was previously notified of the radar, or the like).

In an example, the MME notification forwarding may be used as an alternative to the X2-based enhancements described above. In another example, a hybrid of the MME notification forwarding and the X2-based enhancements may be used. For example, the first eNB 602 may send a notification over the X2 interface to certain eNBs on its radar information forward list, and also send the notification to the MME 604 so that the MME 604 can forward the notification to any eNBs the MME 604 determines should be notified that are not on radar information forward list of the first eNB 602.

The radar detection notification may be sent by the first eNB 602 to the MME 604 as a notification that the first eNB 602 has detected presence of radar in its coverage area according to the information elements described in Table 2 below.

TABLE 2

RADAR DETECTION NOTIFY - in the direction first eNB → MME.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Radar Detection Information | M | | 9.x.x.x | | YES | ignore |

The forwarded radar detection notification may be sent by the MME 604 to the second eNB 606 to notify the second eNB 606 that there is potentially a radar transmission in the coverage area of the second eNB 606, according to the information elements described in Table 3, below.

TABLE 3

RADAR DETECTION NOTIFY FORWARD including
9.x.x.x Radar Detection Information - in
the direction MME → second eNB

| IE/Group Name | Presence | Range | IE type and reference | Semantics description |
|---|---|---|---|---|
| Unlicensed channel type | M | | ENUMERATED (ISM, UNII, . . .) | |
| Unlicensed channel id | M | | INTEGER | |
| Radar Detection Timestamp | BIT STRING (16) | | BIT STRING (16) | |

Figure 7:
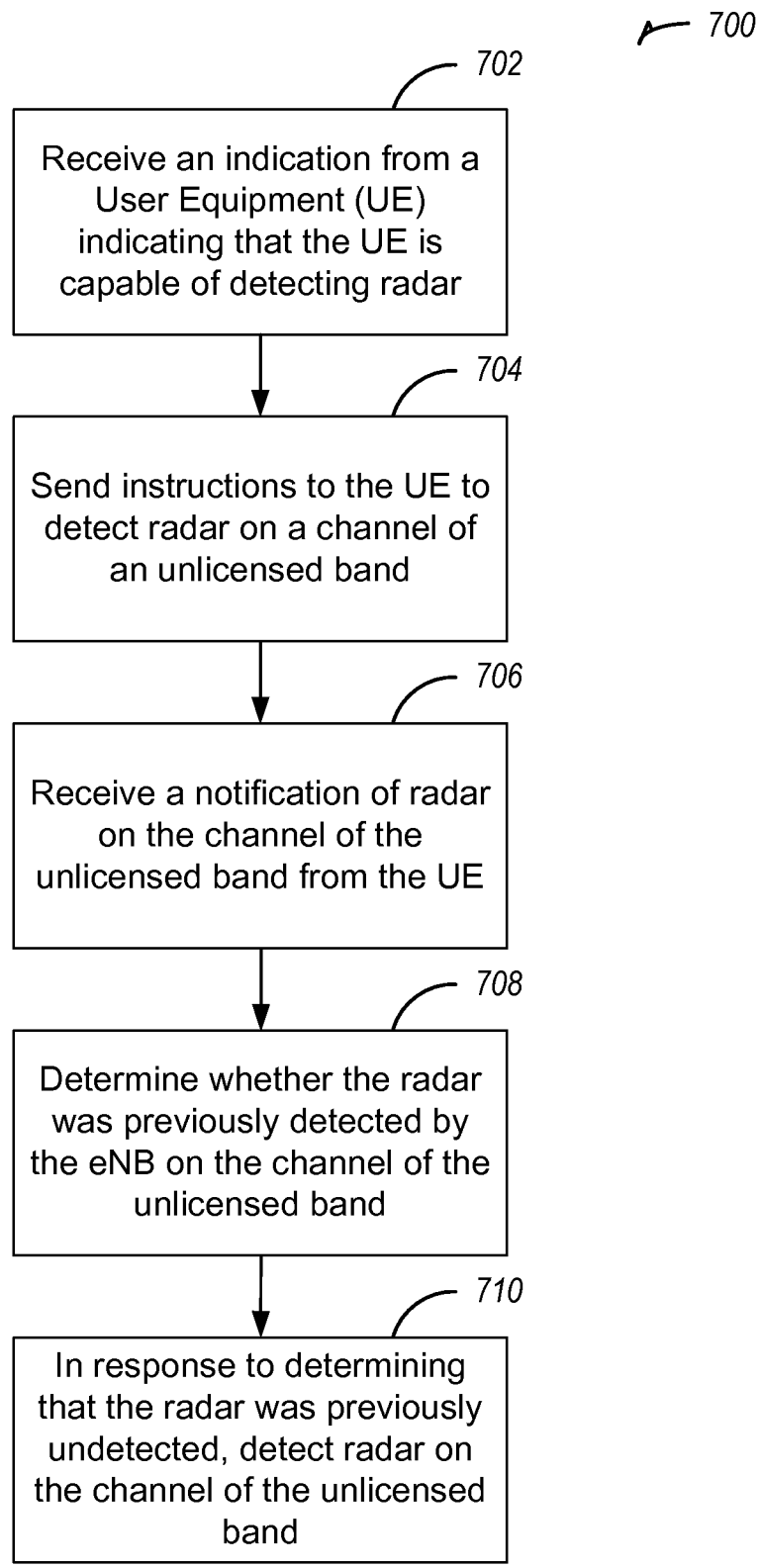
FIG. 7 illustrates generally a flowchart showing a technique for radar detection communication in accordance with some embodiments.

FIG. 7 illustrates generally a flowchart showing a technique 700 for radar detection communication in accordance with some embodiments. In an example, the technique 700 may include an operation 702 to receive, at an eNB, an indication from a User Equipment (UE) indicating that the UE is capable of detecting radar. In an example, the indication includes a capability information message, the capability information message including a radar detection capability value and a list of detectable channels.

The technique 700 may include an operation 704 to send instructions to the UE to detect radar on a channel of an unlicensed band, the instructions including a scheduling information element and a measurement information element. In an example, the scheduling information element includes a selection activating a radar presence detection of a measure object evolved Universal Terrestrial Radio Access (e-UTRA) information element. In another example, the measurement information element includes a selection activating a measure quantity of radar presence in the unlicensed band of a quantity configuration information element.

The technique 700 may include an operation 706 to receive a notification of radar on the channel of the unlicensed band from the UE. In an example, the notification of radar includes a report configuration evolved Universal Terrestrial Radio Access (e-UTRA) information element. The report configuration e-UTRA information element may include a reporting event A7, the event A7 indicating detection of radar in a Secondary Cell (SCell) corresponding to the UE.

The technique 700 may include an operation 708 to determine whether the radar was previously detected by the eNB on the channel of the unlicensed band. The technique 700 may include an operation 710 to, in response to determining that the radar was previously undetected, detect radar on the channel of the unlicensed band. The technique may include disregarding the notification of radar when the radar was previously detected by the eNB and not disregarding the notification of radar when the radar was previously undetected. For example, the technique may include completing operation 710 when the radar was previously undetected, and not disregarding the notification. In another example, the technique may include disregarding the notification and not detecting radar on the channel when the radar was previously detected by the eNB on the channel (e.g., if the UE radar information is redundant or substantially similar, such as including a similar timestamp, the same or similar radar, or the same channel).

In an example, the technique 700 may include an operation to cause the notification of radar on the channel of the unlicensed band to be forwarded to a device, when the device is potentially within range of the radar. The device may include a Mobility Management Entity (MME). The MME may notify a second eNB of the detected radar on the channel when the MME determines that the second eNB has not previously been notified of the detected radar on the channel. In another example, the device may include a second eNB. The technique may include selecting the second eNB from a radar information forward list. In another example, the technique may include preventing traffic from being initiated on the channel for at least 30 minutes after detecting radar on the channel of the unlicensed band at the eNB.

VARIOUS NOTES & EXAMPLES

Each of these non-limiting examples may stand on its own, or may be combined in various permutations or combinations with one or more of the other examples.

Example 1 includes the subject matter embodied by an evolved Node B (eNB) comprising: a transceiver to: receive an indication from a User Equipment (UE) indicating that the UE is capable of detecting radar, send instructions to the UE to detect radar on a channel of an unlicensed band, the instructions including a scheduling information element and a measurement information element, receive a notification of radar on the channel of the unlicensed band from the UE, a processor to: determine whether the radar was previously detected by the eNB on the channel of the unlicensed band, and in response to determining that the radar was previously undetected, detect radar on the channel of the unlicensed band.

In Example 2, the subject matter of Example 1 can optionally include wherein the indication includes a capability information message, the capability information message including a radar detection capability value and a list of detectable channels.

In Example 3, the subject matter of one or any combination of Examples 1-2 can optionally include wherein the scheduling information element includes a selection activating a radar presence detection of a measure object evolved Universal Terrestrial Radio Access (e-UTRA) information element and the measurement information element includes a selection activating a measure quantity of radar presence in the unlicensed band of a quantity configuration information element.

In Example 4, the subject matter of one or any combination of Examples 1-3 can optionally include wherein the notification of radar includes a report configuration evolved Universal Terrestrial Radio Access (e-UTRA) information element.

In Example 5, the subject matter of one or any combination of Examples 1-4 can optionally include wherein the report configuration e-UTRA information element includes a reporting event A7, the event A7 indicating detection of radar in a Secondary Cell (SCell) corresponding to the UE.

In Example 6, the subject matter of one or any combination of Examples 1-5 can optionally include wherein the transceiver is further to cause the notification of radar on the channel of the unlicensed band to be forwarded to a device, when the device is potentially within range of the radar.

In Example 7, the subject matter of one or any combination of Examples 1-6 can optionally include wherein the device is a Mobility Management Entity (MME), and wherein the MME is to notify a second eNB of the detected radar on the channel when the MME determines that the second eNB has not previously been notified of the detected radar on the channel.

In Example 8, the subject matter of one or any combination of Examples 1-7 can optionally include wherein the device includes a second eNB, and wherein the processor is to select the second eNB from a radar information forward list.

In Example 9, the subject matter of one or any combination of Examples 1-8 can optionally include wherein the processor is to disregard the notification of radar when the radar was previously detected by the eNB and not disregard the notification of radar when the radar was previously undetected.

In Example 10, the subject matter of one or any combination of Examples 1-9 can optionally include wherein the processor is to prevent traffic from being initiated on the channel for at least 30 minutes after detecting radar on the channel of the unlicensed band at the eNB.

Example 11 includes the subject matter embodied by at least one machine-readable medium including instructions for operation of a computing system, which when executed by an evolved Node B (eNB), cause the eNB to: receive an indication from a User Equipment (UE) indicating that the UE is capable of detecting radar, wherein the indication includes a capability information message, send instructions to the UE to detect radar on a channel of an unlicensed band, the instructions including an object information element and a scheduling information element, receive a notification of radar on the channel of the unlicensed band from the UE, determine whether the radar was previously detected by the eNB on the channel of the unlicensed band, and forward the notification of radar on the channel of the unlicensed band to a device when the device is potentially within range of the radar.

In Example 12, the subject matter of Example 11 can optionally include wherein the capability information message including a radar detection capability value and a list of detectable channels.

In Example 13, the subject matter of one or any combination of Examples 11-12 can optionally include wherein the scheduling information element includes a selection activating a radar presence detection of a measure object evolved Universal Terrestrial Radio Access (e-UTRA) information element and the measurement information element includes a selection activating a measure quantity of radar presence in the unlicensed band of a quantity configuration information element.

In Example 14, the subject matter of one or any combination of Examples 11-13 can optionally include wherein the notification of radar includes a report configuration evolved Universal Terrestrial Radio Access (e-UTRA) information element.

In Example 15, the subject matter of one or any combination of Examples 11-14 can optionally include wherein the report configuration e-UTRA information element includes a reporting event A7, the event A7 indicating detection of radar in a Secondary Cell (SCell) corresponding to the UE.

In Example 16, the subject matter of one or any combination of Examples 11-15 can optionally include wherein the device is a Mobility Management Entity (MME), and wherein the MME is to notify a second eNB of the detected radar on the channel when the MME determines that the second eNB has not previously been notified of the detected radar on the channel.

In Example 17, the subject matter of one or any combination of Examples 11-16 can optionally include wherein the device includes a second eNB, and further comprising instructions to select the second eNB from a radar information forward list.

In Example 18, the subject matter of one or any combination of Examples 11-17 can optionally include further comprising instructions to, in response to determining that the radar was previously undetected, detect radar on a channel of an unlicensed band.

In Example 19, the subject matter of one or any combination of Examples 11-18 can optionally include further comprising instructions to, in response to determining that the radar was previously detected, disregard the notification of radar.

In Example 20, the subject matter of one or any combination of Examples 11-19 can optionally include further comprising instructions to prevent traffic from being initiated on the channel for at least 30 minutes after detecting radar on the channel of the unlicensed band at the eNB.

Example 21 includes the subject matter embodied by at least one machine-readable medium including instructions for operation of a computing system, which when executed by a User Equipment (UE), cause the UE to: notify an evolved Node B (eNB) that the UE is capable of detecting radar using a capability information message, receive instructions from the eNB to detect radar on a channel of an unlicensed band, detect radar on the channel, and send, to the eNB, an indication, the indication including information about the detected radar on the channel using an event reporting information element.

In Example 22, the subject matter of Example 21 can optionally include wherein the capability information message including a radar detection capability value and a list of detectable channels.

In Example 23, the subject matter of one or any combination of Examples 21-22 can optionally include wherein the instructions from the eNB include a scheduling information element and a measurement information element, the scheduling information element including a selection activating a radar presence detection of a measure object evolved Universal Terrestrial Radio Access (e-UTRA) information element and the measurement information element including a selection activating a measure quantity of radar presence in the unlicensed band of a quantity configuration information element.

In Example 24, the subject matter of one or any combination of Examples 21-23 can optionally include wherein the indication includes a report configuration evolved Universal Terrestrial Radio Access (e-UTRA) information element.

In Example 25, the subject matter of one or any combination of Examples 21-24 can optionally include wherein the report configuration e-UTRA information element includes a reporting event A7, the event A7 indicating detection of radar in a Secondary Cell (SCell) corresponding to the UE.

In Example 26, the subject matter of one or any combination of Examples 21-25 can optionally include further comprising instructions to receive instructions, from the eNB, to prevent traffic from being initiated on the channel for at least 30 minutes after detecting radar on the channel of the unlicensed band.

In Example 27, the subject matter of one or any combination of Examples 21-26 can optionally include wherein the instructions to detect radar include instructions to detect radar using a measure results unlicensed information element.

In Example 28, the subject matter of one or any combination of Examples 21-27 can optionally include wherein the measure results unlicensed information element includes a measurement identification value, an unlicensed channel identification value, and a radar detected value.

Example 29 includes the subject matter embodied by a User Equipment (UE) comprising: a transceiver to: notify an evolved Node B (eNB) that the UE is capable of detecting radar, receive instructions from the eNB to detect radar on a channel of an unlicensed band, the instructions including an object information element and a scheduling information element, a processor to: detect radar on the channel, and wherein the transceiver is to send, to the eNB, an indication, the indication including information about the detected radar on the channel.

In Example 30, the subject matter of Example 29 can optionally include wherein to notify the eNB that the UE is capable of detecting radar includes using a capability information message, the capability information message including a radar detection capability value and a list of detectable channels.

In Example 31, the subject matter of one or any combination of Examples 29-30 can optionally include wherein the instructions from the eNB include a scheduling information element and a measurement information element, the scheduling information element including a selection activating a radar presence detection of a measure object evolved Universal Terrestrial Radio Access (e-UTRA) information element and the measurement information element including a selection activating a measure quantity of radar presence in the unlicensed band of a quantity configuration information element.

In Example 32, the subject matter of one or any combination of Examples 29-31 can optionally include wherein the indication includes a report configuration evolved Universal Terrestrial Radio Access (e-UTRA) information element.

In Example 33, the subject matter of one or any combination of Examples 29-32 can optionally include wherein the report configuration e-UTRA information element includes a reporting event A7, the event A7 indicating detection of radar in a Secondary Cell (SCell) corresponding to the UE.

In Example 34, the subject matter of one or any combination of Examples 29-33 can optionally include further comprising receiving instructions from the eNB to prevent traffic from being initiated on the channel for at least 30 minutes after detecting radar on the channel of the unlicensed band.

In Example 35, the subject matter of one or any combination of Examples 29-34 can optionally include wherein detecting radar includes detecting radar using a measure results unlicensed information element.

In Example 36, the subject matter of one or any combination of Examples 29-35 can optionally include wherein the measure results unlicensed information element includes a measurement identification value, an unlicensed channel identification value, and a radar detected value.

Example 37 includes the subject matter embodied by a method for configuring a User Equipment (UE) for communication performed by circuitry of an evolved Node B (eNB), the method comprising: receiving an indication from the UE indicating that the UE is capable of detecting radar, wherein the indication includes a capability information message, sending instructions to the UE to detect radar on a channel of an unlicensed band, the instructions including an object information element and a scheduling information element, receiving a notification of radar on the channel of the unlicensed band from the UE, determining whether the radar was previously detected by the eNB on the channel of the unlicensed band, and forwarding the notification of radar on the channel of the unlicensed band to a device when the device is potentially within range of the radar.

In Example 38, the subject matter of Example 37 can optionally include wherein the capability information message including a radar detection capability value and a list of detectable channels.

In Example 39, the subject matter of one or any combination of Examples 37-38 can optionally include wherein the scheduling information element includes a selection activating a radar presence detection of a measure object evolved Universal Terrestrial Radio Access (e-UTRA) information element and the measurement information element includes a selection activating a measure quantity of radar presence in the unlicensed band of a quantity configuration information element.

In Example 40, the subject matter of one or any combination of Examples 37-39 can optionally include wherein the notification of radar includes a report configuration evolved Universal Terrestrial Radio Access (e-UTRA) information element.

In Example 41, the subject matter of one or any combination of Examples 37-40 can optionally include wherein the report configuration e-UTRA information element includes a reporting event A7, the event A7 indicating detection of radar in a Secondary Cell (SCell) corresponding to the UE.

In Example 42, the subject matter of one or any combination of Examples 37-41 can optionally include wherein the device is a Mobility Management Entity (MME), and wherein the MME is to notify a second eNB of the detected radar on the channel when the MME determines that the second eNB has not previously been notified of the detected radar on the channel.

In Example 43, the subject matter of one or any combination of Examples 37-42 can optionally include wherein the device includes a second eNB, and further comprising selecting the second eNB from a radar information forward list.

In Example 44, the subject matter of one or any combination of Examples 37-43 can optionally include further comprising, in response to determining that the radar was previously undetected, detecting radar on a channel of an unlicensed band.

In Example 45, the subject matter of one or any combination of Examples 37-44 can optionally include further comprising, in response to determining that the radar was previously detected, disregarding the notification of radar.

In Example 46, the subject matter of one or any combination of Examples 37-45 can optionally include further comprising preventing traffic from being initiated on the channel for at least 30 minutes after detecting radar on the channel of the unlicensed band at the eNB.

In Example 47, the subject matter of one or any combination of Examples 37-46 can optionally include wherein the capability information message includes a radar detection capability value and a list of detectable channels.

In Example 48, the subject matter of one or any combination of Examples 37-47 can optionally include wherein receiving the notification of radar on the channel of the unlicensed band from the UE includes receiving the notification in response to a measure results unlicensed information element from the UE indicating detected radar.

In Example 49, the subject matter of one or any combination of Examples 37-48 can optionally include wherein the measure results unlicensed information element includes a measurement identification value, an unlicensed channel identification value, and a radar detected value.

Example 50 includes an apparatus comprising means for performing any of the methods of examples 37-49.

Example 51 includes at least one machine-readable medium including instructions for operation of a computer system, which when executed by a machine, cause the machine to perform any of the methods of examples 37-49.

Example 52 includes the subject matter embodied by an apparatus for configuring a User Equipment (UE) for communication performed by circuitry of an evolved Node B (eNB), the apparatus comprising: means for receiving an indication from the UE indicating that the UE is capable of detecting radar, wherein the indicaton includes a capability information message, means for sending instructions to the UE to detect radar on a channel of an unlicensed band, the instructions including an object information element and a scheduling information element, means for receiving a notification of radar on the channel of the unlicensed band from the UE, means for determining whether the radar was previously detected by the eNB on the channel of the unlicensed band, and means for forwarding the notification of radar on the channel of the unlicensed band to a device when the device is potentially within range of the radar.

In Example 53, the subject matter of Example 52 can optionally include further comprising means for preventing traffic from being initiated on the channel for at least 30 minutes after detecting radar on the channel of the unlicensed band at the eNB.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:
1. An evolved Node B (eNB) comprising:
a transceiver to:
receive an indication from a User Equipment (UE) indicating that the UE is capable of detecting radar;
send instructions to the UE to detect radar on a channel of an unlicensed band, the instructions including a scheduling information element and a measurement information element;
receive a notification of radar on the channel of the unlicensed band from the UE; and
a processor to:
determine whether the radar was previously detected by the eNB on the channel of the unlicensed band;

in response to determining that the radar was previously undetected, detect radar on the channel of the unlicensed band; and generate signalling to prevent traffic from being initiated on the channel after detection of radar on the channel.

2. The eNB of claim 1, wherein the indication includes a capability information message, the capability information message including a radar detection capability value and a list of detectable channels.

3. The eNB of claim 1, wherein the scheduling information element includes a selection activating a radar presence detection of a measure object evolved Universal Terrestrial Radio Access (e-UTRA) information element and the measurement information element includes a selection activating a measure quantity of radar presence in the unlicensed band of a quantity configuration information element.

4. The eNB of claim 1, wherein the notification of radar includes a report configuration evolved Universal Terrestrial Radio Access (e-UTRA) information element.

5. The eNB of claim 4, wherein the report configuration e-UTRA information element includes a reporting event A7, the event A7 indicating detection of radar in a Secondary Cell (SCell) corresponding to the UE.

6. The eNB of claim 1, wherein the transceiver is further to cause the notification of radar on the channel of the unlicensed band to be forwarded to a device, when the device is potentially within range of the radar.

7. The eNB of claim 6, wherein the device is a Mobility Management Entity (MME), and wherein the MME is to notify a second eNB of the detected radar on the channel when the MME determines that the second eNB has not previously been notified of the detected radar on the channel.

8. The eNB of claim 6, wherein the device includes a second eNB, and wherein the processor is to select the second eNB from a radar information forward list.

9. The eNB of claim 1, wherein the processor is to disregard the notification of radar when the radar was previously detected by the eNB and not disregard the notification of radar when the radar was previously undetected.

10. An evolved Node B (eNB) comprising:
a transceiver to:
receive an indication from a User Equipment (UE) indicating that the UE is capable of detecting radar;
send instructions to the UE to detect radar on a channel of an unlicensed band, the instructions including a scheduling information element and a measurement information element;
receive a notification of radar on the channel of the unlicensed band from the UE; and
a processor to:
determine whether the radar was previously detected by the eNB on the channel of the unlicensed band; and
in response to determining that the radar was previously undetected, detect radar on the channel of the unlicensed band,
wherein the processor is to prevent traffic from being initiated on the channel for at least 30 minutes after detecting radar on the channel of the unlicensed band at the eNB.

11. At least one machine-readable medium including instructions for operation of a computing system, which when executed by an evolved Node B (eNB), cause the eNB to:
receive an indication from a User Equipment (UE) indicating that the UE is capable of detecting radar, wherein the indication includes a capability information message;
send instructions to the UE to detect radar on a channel of an unlicensed band, the instructions including an object information element and a scheduling information element;
receive a notification of radar on the channel of the unlicensed band from the UE;
determine whether the radar was previously detected by the eNB on the channel of the unlicensed band;
forward the notification of radar on the channel of the unlicensed band to a device when the device is potentially within range of the radar; and
generate signalling to prevent traffic from being initiated on the channel after detection of radar on the channel.

12. The machine-readable medium of claim 11, wherein the capability information message including a radar detection capability value and a list of detectable channels.

13. The machine-readable medium of claim 11, wherein the scheduling information element includes a selection activating a radar presence detection of a measure object evolved Universal Terrestrial Radio Access (e-UTRA) information element and the measurement information element includes a selection activating a measure quantity of radar presence in the unlicensed band of a quantity configuration information element.

14. The machine-readable medium of claim 11, wherein the notification of radar includes a report configuration evolved Universal Terrestrial Radio Access (e-UTRA) information element.

15. The machine-readable medium of claim 14, wherein the report configuration e-UTRA information element includes a reporting event A7, the event A7 indicating detection of radar in a Secondary Cell (SCell) corresponding to the UE.

16. The machine-readable medium of claim 11, wherein the device is a Mobility Management Entity (MME), and wherein the MME is to notify a second eNB of the detected radar on the channel when the MME determines that the second eNB has not previously been notified of the detected radar on the channel.

17. The machine-readable medium of claim 11, wherein the device includes a second eNB, and further comprising instructions to select the second eNB from a radar information forward list.

18. A User Equipment (UE) comprising:
a transceiver to:
notify an evolved Node B (eNB) that the UE is capable of detecting radar;
receive instructions from the eNB to detect radar on a channel of an unlicensed band, the instructions including an object information element and a scheduling information element; and
a processor to:
detect radar on the channel; and
wherein the transceiver is to send, to the eNB, an indication, the indication including information about the detected radar on the channel; and
receive signalling to prevent traffic from being initiated on the channel after detection of radar on the channel.

19. The UE of claim 18, wherein to notify the eNB that the UE is capable of detecting radar includes using a capability information message, the capability information message including a radar detection capability value and a list of detectable channels.

20. The UE of claim 18, wherein the instructions from the eNB include a scheduling information element and a measurement information element, the scheduling information element including a selection activating a radar presence detection of a measure object evolved Universal Terrestrial Radio Access (e-UTRA) information element and the measurement information element including a selection activating a measure quantity of radar presence in the unlicensed band of a quantity configuration information element.

21. The UE of claim 18, wherein the indication includes a report configuration evolved Universal Terrestrial Radio Access (e-UTRA) information element.

22. The UE of claim 21, wherein the report configuration e-UTRA information element includes a reporting event A7, the event A7 indicating detection of radar in a Secondary Cell (SCell) corresponding to the UE.

23. The UE of claim 18, wherein detecting radar includes detecting radar using a measure results unlicensed information element.

24. The UE of claim 23, wherein the measure results unlicensed information element includes a measurement identification value, an unlicensed channel identification value, and a radar detected value.

25. A User Equipment (UE) comprising:
a transceiver to:
notify an evolved Node B (eNB) that the UE is capable of detecting radar;
receive instructions from the eNB to detect radar on a channel of an unlicensed band, the instructions including an object information element and a scheduling information element; and
a processor to:
detect radar on the channel; and
wherein the transceiver is to send, to the eNB, an indication, the indication including information about the detected radar on the channel, and
wherein the transceiver is configured to receive instructions from the eNB to prevent traffic from being initiated on the channel for at least 30 minutes after detecting radar on the channel of the unlicensed band.

* * * * *